H. H. NICHOLS.
EGG TRAY FOR INCUBATORS.
APPLICATION FILED MAY 31, 1913.
1,115,236.
Patented Oct. 27, 1914.
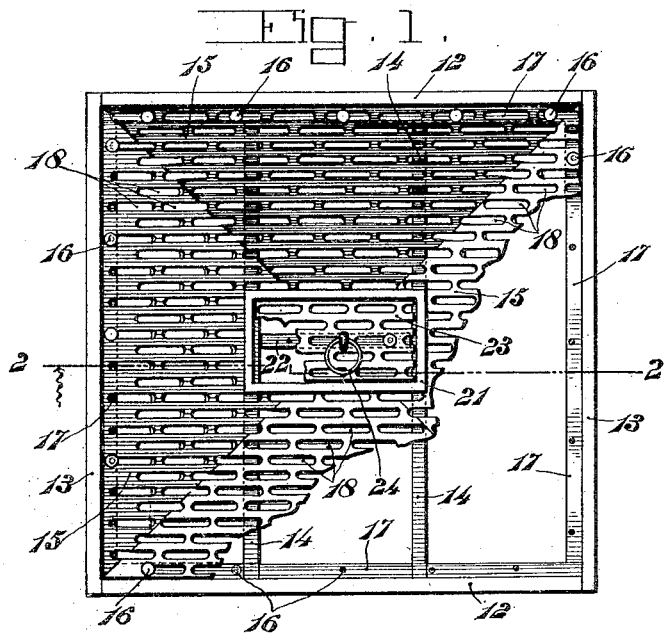
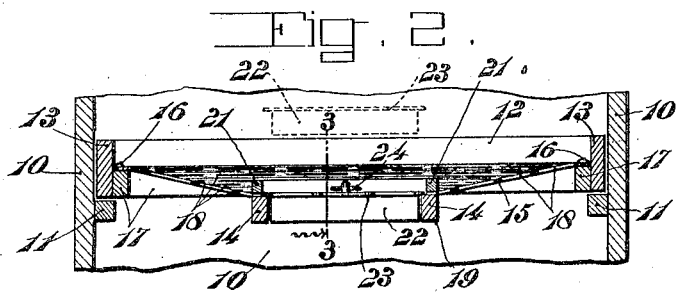
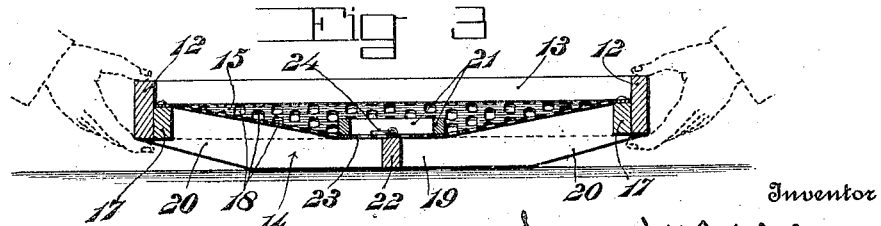

UNITED STATES PATENT OFFICE.

HOMER H. NICHOLS, OF CARMEL, NEW YORK.

EGG-TRAY FOR INCUBATORS.

1,115,236. Specification of Letters Patent. Patented Oct. 27, 1914.

Application filed May 31, 1913. Serial No. 770,919.

*To all whom it may concern:*

Be it known that I, HOMER H. NICHOLS, a citizen of the United States, residing at Carmel, in the county of Putnam and State of New York, have invented or discovered certain new and useful Improvements in Egg Trays for Incubators, of which the following is a specification, reference being had therein to the accompanying drawings.

This invention relates to egg trays for use in incubators and has for its objects to provide an egg tray of sanitary construction, which will permit the eggs to be easily turned without jarring, which may be easily handled and carried without danger of accident, which will facilitate and expedite the removal of the chicks therefrom into the usual brooder or nursery chamber as soon as hatched with a minimum disturbance of the hatching and unhatched eggs, and which may be conveniently and securely supported upon any suitable flat surface and at the same time provide for a free and uninterrupted circulation of air from every direction, both above and below the eggs, for the purpose of more quickly ventilating and cooling the same. These and other objects of the invention, together with means whereby the same may be carried into effect, will best be understood from the following description of one form or embodiment thereof illustrated in the accompanying drawings. It will be understood, however, that the construction described and shown has been chosen for illustrative purposes merely, and that the invention may be embodied in other forms without departing from the spirit and scope thereof.

In said drawings: Figure 1 is a plan view of an egg tray constructed in accordance with the invention, the bottom of the tray being partly broken away to show the frame parts beneath. Fig. 2 is a vertical sectional view, substantially on the line 2—2, Fig. 1, showing the tray in place in an incubator. Fig. 3 is a vertical sectional view, substantially on the line 3—3, Fig. 2, showing the tray supported upon a flat surface and illustrating the manner of lifting the same.

In Fig. 2, 10 denotes the walls of the egg chamber of an incubator and 11 one pair of the usual guides or supports upon which the egg trays are slidably mounted for removal through the front of the incubator. The particular construction of the incubator proper forms no portion of the present invention and may be of any usual or well known type. The parts above referred to, however, are conventionally shown in Fig. 2 in order to illustrate more fully the use of the tray.

The egg tray forming the subject of the present invention comprises a frame consisting of border members including front and rear end members 12 and side members 13, and cross or supporting members 14 connecting said end members intermediate the side members, and a foraminous bottom 15 supported by said frame. Said bottom is preferably secured, as by tacks 16, to strips 17 nailed or otherwise secured to the inner faces of the border members 12 and 13, and rests upon the tops of the intermediate supporting members 14. Said bottom is preferably composed of suitable sheet metal, such as zinc, having a flat or even and uninterrupted upper surface and provided with perforations 18 which are preferably of the elongated form shown most clearly in Fig. 1 and in staggered relation to one another. The perforated sheet metal bottom shown is considered preferable to the usual egg tray bottom of woven wire fabric or the like in that it presents a smooth and continuous surface which may be easily cleaned, since there are no inaccessible crevices or joints in which dirt can accumulate, and upon which the eggs may be turned easily and without jarring the same. Moreover perforations of the particular form and arrangement shown have been found in practice to be especially advantageous, since they permit the use of a sheet metal tray bottom while providing for a free and uninterrupted circulation of air about the eggs. In accordance with certain features of the invention hereinafter explained, however, it will be obvious that a woven wire or other foraminous bottom may be substituted for the perforated sheet metal bottom herein shown.

When in place in the incubator the side members 13 of the tray rest upon the guides 11 and may be slid inwardly or outwardly thereon to permit the insertion or removal of the tray, as will be familiar to those skilled in the art, the supporting members 14 being intermediate said side members and offering no obstruction to this usual operation. The form of the supporting members 14 is preferably substantially as shown in Fig. 3, said members comprising horizontal central portions 19 and upwardly and outwardly inclined end portions 20 which are suitably joined to the end members 12 of the frame. The portions 19 of said supporting members provide a central support for the tray as a whole upon which said tray may rest on any suitable flat surface, as shown in Fig. 3, with all of its edges elevated above said surface. This construction results in two important advantages. In the first place, as is well known to those skilled in the art, it is occasionally necessary or desirable to remove the egg trays from the incubator for the purpose of ventilating or cooling the eggs. In order effectually and evenly to accomplish this purpose it is necessary that said eggs be freely and evenly exposed to the air both above and below. To this end it has heretofore been customary to provide the top of an incubator with strips or slides upon which a removed tray may rest in an elevated position in order to permit access of the air to the under side thereof. A tray constructed in accordance with the present invention, however, may be placed upon any flat surface, and when in such position will be supported with all of its edges and its entire bottom elevated, permitting a free and uninterrupted circulation of air from every direction below the eggs. In this manner the cooling strips or slides at the top of the incubator are eliminated, and the number of trays of eggs which may be simultaneously cooled is not limited by the available space on the top of the incubator, it being even possible to remove the trays from the room in which the incubator is located if desirable for the purpose of securing more advantageous atmospheric conditions. In the second place, in handling an egg tray filled with eggs, it is of course necessary to exercise considerable care, and it is desirable that in picking up said tray the operator be able to secure a firm grip upon the same.

As will be seen from Fig. 3, in lifting from a flat surface a tray constructed in accordance with the present invention, the hands of the operator may be freely inserted beneath the edges of the tray, thereby providing for a much firmer grip than can be obtained by grasping the upper edges of the sides of the tray by the fingers, as in usually necessary in the case of trays as at present constructed.

The construction of the supporting members 14 is such that the bottom 15 of the tray is caused to assume the form of a shallow hopper, having a depressed central portion from which said bottom slopes upwardly, preferably in all directions, toward the sides or edges of the tray.

In incubators as usually constructed it is customary to make provision whereby the chicks, as they are hatched, may fall from the egg trays into a nursery or brooder chamber beneath the same. To this end the straight forward edges of the egg trays are usually spaced a slight distance from the front wall of the incubator. It is desirable, however, for several reasons, that a chick be removed from the egg tray as soon as possible after hatching. In incubators as heretofore constructed it has been necessary for a chick hatched from an egg in the rear of a tray to traverse the entire length of the tray in order to leave the same and enter the brooder chamber.

In accordance with the present invention the bottom 15 of the tray is provided with a substantially centrally arranged opening located in the depressed central portion of said bottom. By this arrangement the removal of the hatched chicks from the tray is greatly expedited, travel over a minimum number only of unhatched or hatching eggs being necessary, this removal being further facilitated by the downward inclination of the side portions of the bottom of the tray toward said opening.

21 denotes egg retaining strips surrounding the opening in question to assist in retaining the eggs in proper position on the sloping portions of the bottom. Normally, or at all times except during the hatching period, said opening is preferably closed by a removable door or closure comprising a section 23 of material similar to that of which the bottom 15 of the tray is composed secured to a block 22 of wood or other material of a suitable length to fit between the supporting members 14 of the frame. When said door or closure is in place the ends of the section 23 thereof rest upon the edges of said supporting members 14. Upon the approach of the hatching period said closure may be removed by means of the ring or handle 24 secured to the block 22.

Having thus described my invention I claim:

1. An egg tray for incubators comprising a frame composed of border members and intermediate supporting members, the bottoms of said border members being higher than the central portions of said supporting members, and a foraminous bottom supported by said frame.

2. An egg tray for incubators comprising a frame composed of side members, end members and cross members connecting said end members intermediate said side members, said cross members being formed with substantially horizontal central portions and the bottoms of said end members being higher than the bottoms of the central portions of said cross members, and upwardly inclined end portions, and a foraminous bottom supported by the inclined portions of said cross members and provided with a substantially central opening.

3. An egg tray for incubators comprising side members, end members, cross members connecting said end members intermediate said side members, said cross members being formed with substantially horizontal central portions upon the bottoms of which said tray may be supported and with upwardly inclined end portions, and the bottoms of said end members being higher than the bottoms of the central portions of said cross members, and a foraminous bottom resting upon the tops of the inclined portions of said cross members.

4. An egg tray for incubators comprising side members, end members, cross members connecting said end members intermediate said side members, said cross members being formed with substantially horizontal central portions upon the bottoms of which said tray may be supported and with upwardly inclined end portions, and the bottoms of said side and end members being higher than the bottoms of the central portions of said cross members, and a foraminous bottom resting upon the tops of the inclined portion of said cross members and provided with a substantially central opening.

5. An egg tray for incubators comprising side members, end members, cross members connecting said end members intermediate said side members, said cross members being formed with substantially horizontal central portions upon the bottoms of which said tray may be supported and with upwardly inclined end portions, and the bottoms of said side and end members being higher than the bottoms of the central portions of said cross members, a foraminous bottom resting upon the top of the inclined portions of said cross members and provided with a substantially central opening, and a removable closure for said opening also resting upon the tops of said supporting members.

In testimony whereof I affix my signature, in presence of two witnesses.

HOMER H. NICHOLS.

Witnesses:
　JAMES H. NICHOLS,
　STANLEY D. CORNISH.

---

Copies of this patent may be obtained for five cents each, by addressing the "Commissioner of Patents, Washington, D. C."

Correction in Letters Patent No. 1,115,236.

It is hereby certified that in Letters Patent No. 1,115,236, granted October 27, 1914, upon the application of Homer H. Nichols, of Carmel, New York, for an improvement in "Egg-Trays for Incubators," an error appears in the printed specification requiring correction as follows: Page 2, line 56, for the word "in" read *is;* and that the said Letters Patent should be read with this correction therein that the same may conform to the record of the case in the Patent Office.

Signed and sealed this 1st day of December, A. D., 1914.

[SEAL.]

R. F. WHITEHEAD,
*Acting Commissioner of Patents.*